Sept. 11, 1934.   P. L. GEER   1,973,688
GLASS MELTING FURNACE
Filed Aug. 23, 1930   2 Sheets-Sheet 1

Sec. XX

INVENTOR.
Paul L. Geer
BY William B. Jaspert
ATTORNEY.

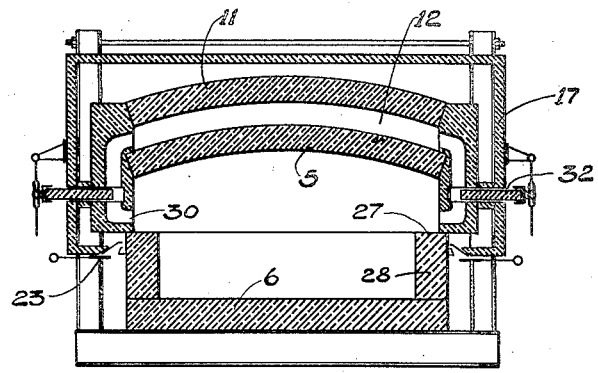
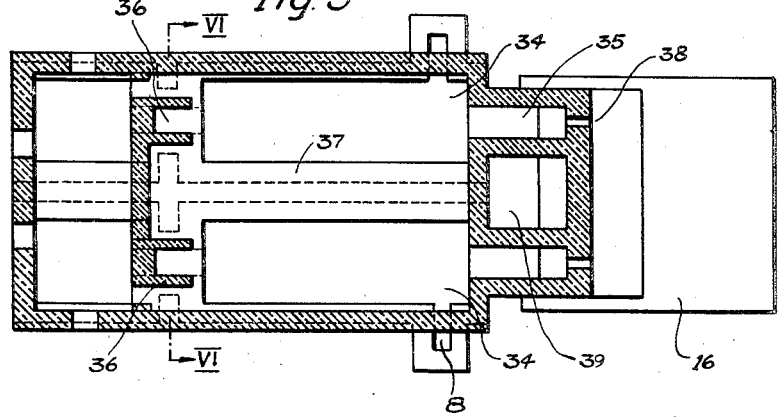
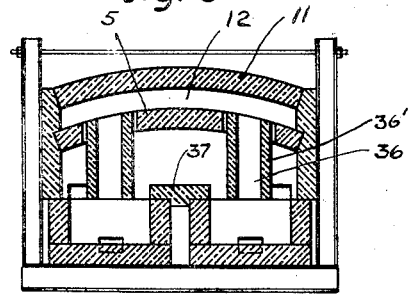

Patented Sept. 11, 1934

1,973,688

UNITED STATES PATENT OFFICE 1,973,688

GLASS MELTING FURNACE

Paul L. Geer, Bellevue, Pa., assignor to Amco, Incorporated, Pittsburgh, Pa., a corporation of Pennsylvania Application August 23, 1930, Serial No. 477,200

9 Claims. (Cl. 49—54)

This invention relates to glass melting furnaces and more particularly to rear fired furnaces wherein the waste gases are withdrawn at a point remote from the rear of the furnace and returned to a heat exchanger located near the rear of the furnace.

Heretofore, the length of the end fired furnace has been limited, due to the fact that it has been practically impossible to force the flame forward far enough to cover the entire hearth due to the tendency of the gases to travel the shortest distance to the stack, which is also located at the rear of the furnace, thus forcing the builder to confine the design of his furnace to smaller sizes although there is an ever increasing demand for the longer furnace to permit the manufacture of large tonnages of glass.

In accordance with the present invention the waste gas outlet or outlets are provided near the forward part of the tank so that the flame will be forced to travel over the entire melting hearth and by so doing it is possible to build a furnace any desired length.

A further object of the invention is to provide a double crown tank to maintain a high preheat of the air for combustion purposes, and which is adapted to conserve the heat of the waste gases as much as possible before they enter the heat exchanger.

Up to the present time it has been found practically impossible to insulate the crown of glass melting or other high temperature furnaces, due to the fact that no material has been found that will stand up under such service, therefore, in order to eliminate as far as possible the loss of heat due to radiation, I have provided an insulating shroud that surrounds the entire furnace or in some cases where this would seem impractical on account of repairing facilities, I propose to extend this shroud around the portion of the furnace above the hearth.

Another object of the invention is the provision of means for setting up circulation of the air between the shroud and the tank wall to pick up the heat that radiates from the wall of the tank and to utilize the preheated air as the primary air passing to the recuperator and thence to the tank to support combustion, or to employ the heated air for other purposes such as heating a factory.

Another object of this invention is the provision of means for dividing the furnace chamber into two distinct temperature zones.

Figure 1:
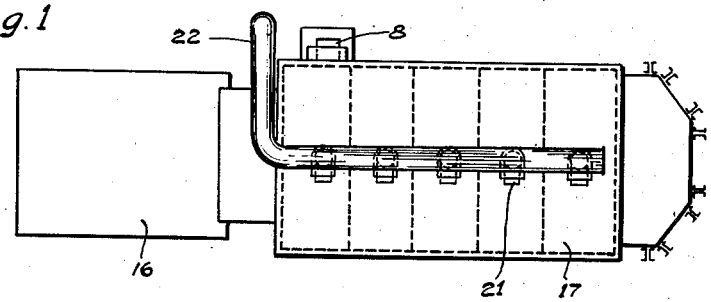
Figure 2:
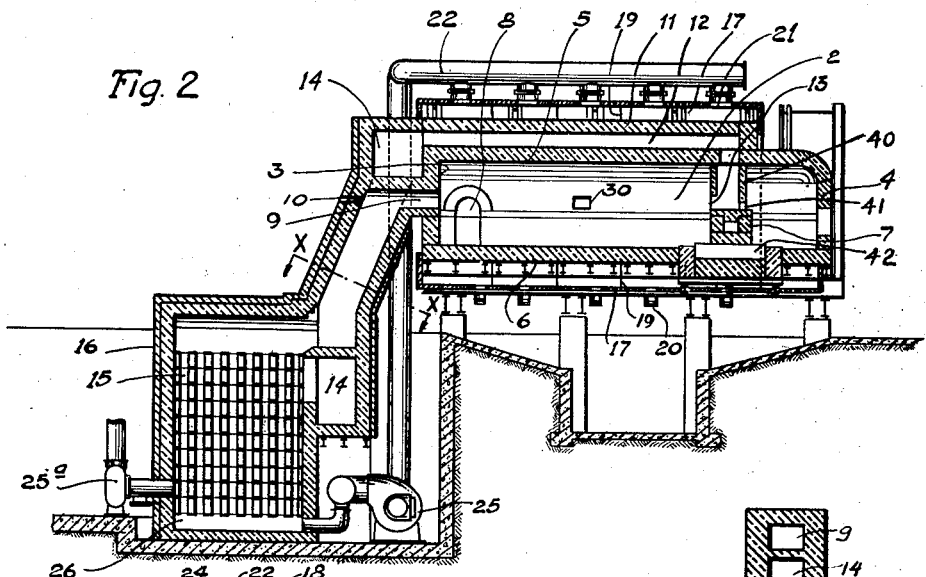
Figure 3:
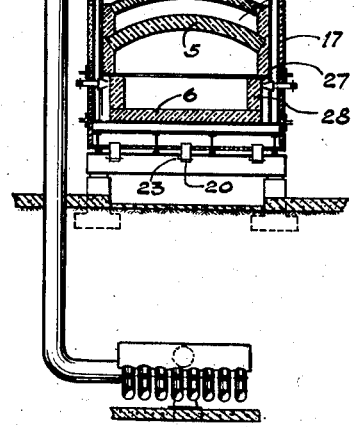

These and other objects of the invention will become more apparent from a consideration of the accompanying drawings in which like reference characters designate like parts and in which Figure 1 is a top plan view of a glass melting furnace embodying the principles of this invention; Figure 2 a vertical sectional view taken longitudinally of the furnace structure shown in Fig. 1; Figure 3 a transverse cross sectional view thereof; Figure 4 a cross sectional view illustrating damper regulating means, and Figures 5 and 6 horizontal cross sectional and vertical transverse sections of a twin tank type of glass melting furnace.

With reference to Figures 1 to 4 inclusive of the drawings the structure therein illustrated comprises a melting tank generally designated by the reference character 2, having a rear wall 3, front wall 4, a roof 5 and hearth 6, the latter being supported on a suitable foundation structure and a bridge wall 7 is provided for separating the refined glass from the glass melting zone of the furnace.

The tank 2 is provided with a charging opening 8 through which the glass batch material is charged into the tank and is further provided with a passage 9 and burner ports 10 through which the preheated air and combustible gaseous mixture are directed into the rear portion of the furnace chamber.

As shown in Figures 2 and 3, a crown 11 is provided above the roof 5 forming a space 12 which constitutes a waste gas passage that communicates with the front of the furnace through a passage 13 leading from the melting chamber, and the other end of the chamber 12 communicates with the waste gas passage 14 leading to the tile structure 15 of a recuperator generally designated at 16.

A shroud 17 of suitable insulating material is provided around the sides, top and bottom walls of the furnace shown in Figures 1 and 2 to form an air space 18 which is divided into separate compartments as shown by the lines 19 to prevent the circulating air from taking the shortest path to the exhaust passage. These compartments are provided with air inlets 20 at the bottom of the furnace and outlets 21 which latter communicate with a common exhaust passage 22. The inlets 20 and outlets 21 are provided with regulable dampers 23 and 24 respectively. The passage 22 extends downwardly to an exhaust 25 adjacent the bottom of the recuperator 16 and the air entering the inlets 20 and passing through the outlets 21 is drawn through passage 22 by the exhaust device 25 and directed to the intake chamber 26 of the recuperator from which it passes through the vertical tile passages into the air intake passage 9 leading to the rear of the furnace chamber 2.

As shown in Figure 3, the jacket or insulating wall 17 extends below the block designated at 27 so that the air entering the inlets 20 may be conducted around the blocks 28 to cool them and then passed along the side wall of the furnace and into the passage 22 from which it is drawn to the recuperator structure.

To provide for the withdrawal of hot gases at intermediate portions of the melting chamber 2, waste gas passages 30 may be provided in spaced relation as shown in Figure 2, these passages 30 and the passage 13 being disposed adjacent the surface of the glass level of the pool for the purpose of directing the high temperature flame, as near to the surface of the glass as is possible.

In some instances it may be necessary or desirable to maintain a very high temperature in the melting zone of the furnace and a much cooler temperature in the working end of the furnace, and for this purpose of maintaining two zones of widely different temperatures, I have provided a dividing wall 40, Figure 2; this wall 40 is preferably located at the end of the melting zone, which as hereinbefore mentioned, is established by the waste gas outlet 13 which is the extreme length of travel of the high temperature flame. The passage 13 may, therefore, be conveniently located in the dividing wall 40. Dividing wall 40 is in effect an extension of the bridge wall 7 and may be provided with a peep hole 41 which for the purpose of maintaining separate temperature zones, is closed by a refractory plug, not shown. Flow of glass from the melting chamber to the working chamber is through passage 42 below bridge wall 7.

In the modification of the apparatus as shown in Figure 4, the outer insulating wall structure 17 extends slightly below the block line 27, this construction being preferred where it is desired to render blocks 28 accessible from the exterior of the furnace for the purpose of renewal.

As shown in Figure 4, the waste gas passages 30 extend into the main passage 12 and are controllable by the dampers 32 and 33.

In Figures 5 and 6 are shown a twin type glass tank in which a pair of longitudinally disposed chambers 34 are each provided with an inlet passage 35 and an outlet passage 36 disposed in the center line of the several tanks, the tanks being divided by a wall 37 as shown in Figure 6.

The inlet passages 35 are provided with burner ports 38 and the passages 35 conduct the preheated air from the recuperator structure 16. 39 designates the waste gas passage leading to the recuperator, the gases being withdrawn from the front end of the furnace or at any intermediate portion as illustrated in connection with the structure shown in Figures 1 and 2 of the drawings.

The exhaust passages 36 consist of renewable flues 36' which extend from a point adjacent the level of the glass through the roof 5 directly to the chamber 12 formed by the crown 11. This construction prevents the batch from attacking the silica roof 5 and permits replacement of the relatively inexpensive flues 36'.

In the operation of the glass melting furnace embodying the principles of this invention as herein disclosed, the batch material may be fed continuously through the opening 8 and the refined glass passes around the bridge wall 7 into the refining zone at the front end of the furnace. By operating the exhaust 25a, of the recuperator, the waste gases are drawn lengthwise of the furnace and exhausted through the opening 13 in chamber 12, thence through the passage 14 into the recuperator from which it passes to the atmosphere through the exhaust mechanism 25a. The primary air for supporting combustion in the melting chamber is drawn in through the inlets 20 at the bottom of the furnace and passes through the individual chambers constituted by the dividing wall 19 through the outlet passage 21 and thence downwardly through the exhaust member 25 into the air chamber 26 at the bottom of the recuperator structure from which it passes upwardly into the passage 9 and into the rear of the melting chamber at which point it will commingle with the combustible products to support combustion within the heating chamber.

Air so drawn in at the bottom of the furnace cools off the block of the glass tank and picks up the heat otherwise lost by radiation of the furnace side walls and roof structure, and is in a preheated condition when it enters the recuperator wherein it is further heated by the waste gases passing around the heat exchanging tile structure 15 and thence it passes into the melting chamber. By means of the dampers 23 and 24, the amount of air drawn around the furnace structure and into the recuperator may be readily controlled.

In the twin tank type of furnace shown in Figures 5 and 6, the gases may be withdrawn in a manner similar to that practiced in the structure shown in Figure 2, that is, passages like the passage 30 and the passage 36 will keep the high temperature flame adjacent the glass surface and will draw the flame along the entire length of the melting zone. By providing a separate outlet 36 for each of the twin tanks 34 and by providing suitable regulating means for controlling the inlet and outlet passages, glass may be refined at different temperatures in the several tanks and the chambers may be operated to provide the needs of the user.

By providing the outlet passages 30 intermediate the rear and the front of the furnace, and by controlling the volume of the waste gases passing through the outlets 30, the length of flame may be regulated. This arrangement is important in furnaces where the glass is of such chemical consistency that it can be melted quickly and by regulating the length of flame for a particular kind of glass greater area for refining may be provided.

Although one embodiment of the invention has been herein illustrated and described, it will be obvious to those skilled in the art that various modifications may be made in the details of construction without departing from the principles herein set forth.

I claim:

1. A glass melting tank comprising an enclosed wall structure forming a melting chamber, an air and combustible gas inlet at the rear of said chamber, means for drawing a high temperature flame from the inlet at the rear of said chamber toward the front thereof, and means for controlling the length of said flame.

2. A glass melting tank comprising an enclosed wall structure, forming a melting chamber, an air and combustible gas inlet at the rear of said chamber, a main exhaust gas outlet near the front of said chamber and auxiliary outlets intermediate the main outlet and the rear of the chamber and means for controlling the volume of the waste gases passing through the respective outlets to regulate the length of the flame.

3. A glass melting tank comprising an enclosing wall structure forming a melting chamber, a material feeding inlet at the rear thereof, a fuel and air supply passage at the rear of said chamber, a bridge wall dividing the tank into glass melting and refining zones, and exhaust means communicating with the chamber at the bridge wall and adjacent the level of the glass pool of said tank.

4. The combination with a glass melting tank of a recuperator therefor, said tank comprising an enclosing wall structure forming a melting chamber, fuel supply and waste gas exhaust means communicating with said chamber, a housing enveloping the wall structure, partitions dividing the space between said housing and wall into a plurality of air circulating chambers, air inlets and outlets for said circulating chambers, and regulating means therefor, a common exhaust connection for said outlets, and means for conducting the air from said common exhaust connection to the air inlet of the recuperator structure.

5. The combination with a glass melting tank of a recuperator therefor, said tank comprising an enclosing wall structure forming a melting chamber, a double roof on said chamber, material charging means at the rear end of said chamber and exhaust means at the other end of said chamber, said exhaust means being adapted to withdraw the waste gases from the melting chamber and conduct them to said recuperator, and a housing enveloping said melting chamber and regulable means for drawing air between the said chamber and said housing and conducting the same to the air inlet of the recuperator structure.

6. Apparatus as set forth in claim 5 in which the wall structure of the melting chamber in the housing are separated to form a space, and means dividing said space into separate air circulating chambers.

7. A glass melting tank furnace comprising an enclosed wall structure forming a melting chamber, an air and combustible gas inlet at one end of said furnace for continuously supplying a gaseous flame stream along the furnace and outlet means remote from the said inlet to control the length of the said flame stream.

8. A glass melting tank comprising an enclosed wall structure forming a melting chamber, a continuous air and combustible gas inlet at the rear of said chamber, a waste gas flue over said melting chamber, outlets at spaced intervals connecting said chamber with said waste gas flue and dampers in said outlets to selectively regulate the temperature of the said furnace by flowing the combustible gases through the furnace at spaced intervals.

9. The combination with a glass melting tank of a continuous heat exchanger therefor, said tank comprising an enclosing wall structure forming a melting chamber, a double roof on said chamber, fuel supply and waste gas exhaust means communicating with said chamber and heat exchanger, air circulating chambers externally of the said double roof, an exhaust means for the air circulating chambers creating a flow of air through the said chambers, means regulating the admission of air to the spaced chambers to selectively cool overheated parts of the furnace and preheat the air, said exhaust means subsequently delivering the air to the heat exchanger for further preheating by the waste furnace gases.

PAUL L. GEER.